United States Patent
Lewis

(10) Patent No.: US 9,843,847 B2
(45) Date of Patent: Dec. 12, 2017

(54) TEMPERATURE-HUMIDITY MONITORING ASSEMBLY FOR CLOSED SERVER CABINET

(71) Applicant: Benjamin Evan Lewis, Waukee, IA (US)

(72) Inventor: Benjamin Evan Lewis, Waukee, IA (US)

(73) Assignee: Telephone and Data Systems, Inc., Chicago, IL (US)

( * ) Notice: Subject to any disclaimer, the term of this patent is extended or adjusted under 35 U.S.C. 154(b) by 379 days.

(21) Appl. No.: 14/261,068

(22) Filed: Apr. 24, 2014

(65) Prior Publication Data

US 2014/0320308 A1 Oct. 30, 2014

Related U.S. Application Data

(60) Provisional application No. 61/815,952, filed on Apr. 25, 2013.

(51) Int. Cl.
*G08C 19/22* (2006.01)
*H04Q 9/00* (2006.01)

(52) U.S. Cl.
CPC ..................... *H04Q 9/00* (2013.01)

(58) Field of Classification Search
None
See application file for complete search history.

(56) References Cited

U.S. PATENT DOCUMENTS

2005/0046658 A1\* 3/2005 Kojima ............... B41J 2/2139
347/19
2005/0286220 A1\* 12/2005 Moore ............. H05K 7/20836
361/679.46

(Continued)

FOREIGN PATENT DOCUMENTS

CN 202182784 U \* 4/2012
KR 20100083049 A \* 7/2010

OTHER PUBLICATIONS

Abdelmaksoud et al., Improved Computational Fluid Dynamics Model for Open-Aisle Air-Cooled Data Center Simulations, Jul. 24, 2013, ASME, pp. 1-13.\*

(Continued)

*Primary Examiner* — Brian Zimmerman
*Assistant Examiner* — Kevin Lau
(74) *Attorney, Agent, or Firm* — Leydig, Voit & Mayer, Ltd.

(57) ABSTRACT

A system is described for monitoring an environmental parameter in a closed server cabinet. The monitoring system includes a cabinet sensor probe (CSP) that includes a sensor assembly and a vertical linear actuator. The sensor assembly includes at least three environmental parameter sensors, wherein each one of the environmental parameter sensors is configured to at least render a signal representative of a sensed temperature. The sensor assembly also includes a sensor carriage configured to hold the at least three environmental parameter sensors at particular horizontally distinct positions such that each one of the at least three environmental parameter sensors occupies a position horizontally displaced from each of the other ones of the at least three environmental parameter sensors. The CSP further includes a vertical linear actuator that is configured to move (Continued)

the sensor assembly along a linear vertical path between a top and bottom of a door of the closed server cabinet.

12 Claims, 9 Drawing Sheets

(56) References Cited

U.S. PATENT DOCUMENTS

| | | | | |
|---|---|---|---|---|
| 2007/0187343 A1* | 8/2007 | Colucci | ................... | G06F 1/181 |
| | | | | 211/26 |
| 2008/0037217 A1* | 2/2008 | Murakami | ............. | H05K 7/206 |
| | | | | 361/695 |
| 2009/0234613 A1* | 9/2009 | Brey | ...................... | G01B 21/00 |
| | | | | 702/130 |

OTHER PUBLICATIONS

Benchoff, "Hackaday; Roomba Becomes Data Center Robot," webpage http://hackaday.com/2013/02/13/roomba-becomes-data-center-robot/, dated Feb. 13, 2013 (10 pages).

Ner Data Corporation, "Aurora High Resolution Temperature Sensing Strip," webpage http://web.archive.org/web/20130508234520/http://www.nerdata.com/monitoring_Aurora.htm, dated May 8, 2013 (2 pages).

* cited by examiner

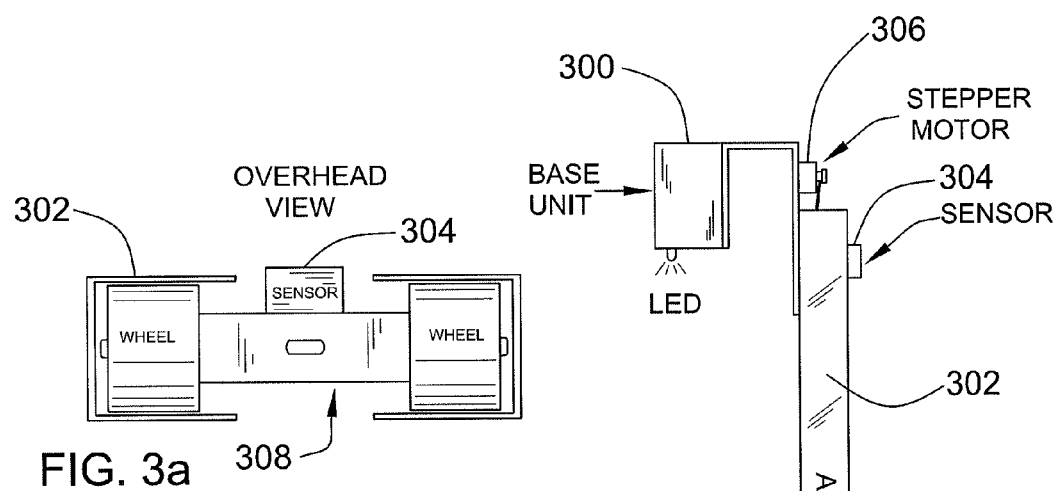
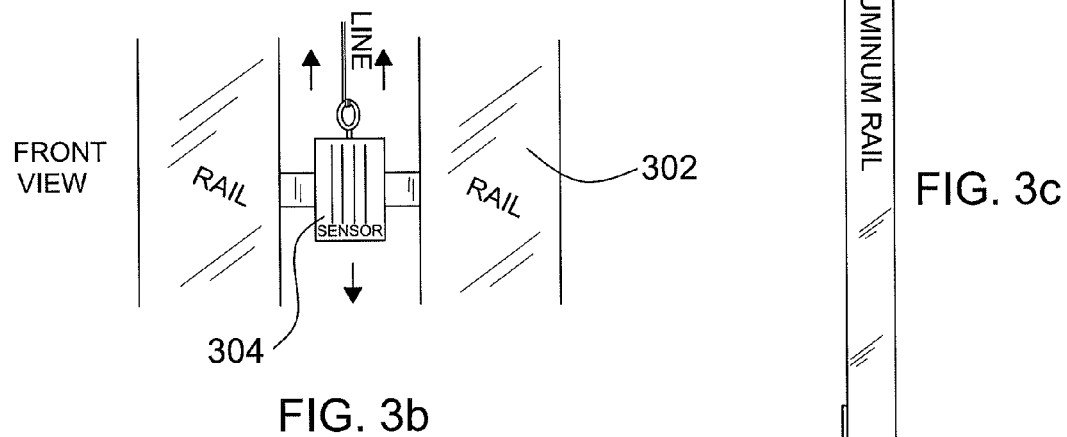
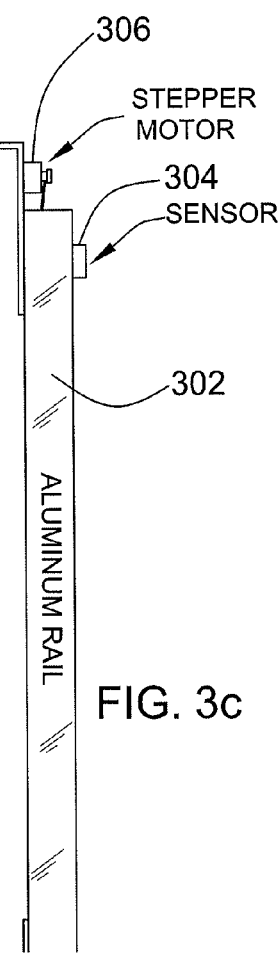
FIG. 3a
FIG. 3b
FIG. 3c

TEMPERATURE-HUMIDITY MONITORING ASSEMBLY FOR CLOSED SERVER CABINET

CROSS-REFERENCE TO RELATED APPLICATION

This patent application is the non-provisional of U.S. Provisional Application Ser. No. 61/815,952, filed Apr. 25, 2013, entitled "Temperature-Humidity Monitoring Assembly for Closed Server Cabinet," the contents of which are expressly incorporated herein by reference in their entirety, including any references therein.

FIELD OF THE INVENTION

This invention relates generally to the field of rack mounted server assemblies. More particularly, the invention is directed to sensor assemblies that are integrated with and/or incorporated into closed server cabinets to monitor an operating environment (e.g., temperature and relative humidity) in such server assemblies.

BACKGROUND OF THE INVENTION

One aspect of maintaining large numbers of servers within a facility (e.g. server farm) involves regulating the air temperature and relative humidity levels as well as airflow to ensure operating conditions favorable to long-term functioning of rack-mounted servers. High temperature and/or abnormal humidity conditions lead to shortened lifespan of the servers, increased outages, and unplanned service interruptions.

Continuous, regular sensing of temperature and humidity conditions within the closed server rack cabinets presents a variety of logistical challenges. A closed cabinet design in data centers prevents accurate inside-of-cabinet climate measurement without direct disturbance of that targeted environment. Assessing and troubleshooting cabinet climate abnormalities (e.g., excessively high temperature and/or relative humidity) are limited to reports from customer equipment which often report chip-level temperatures rather than a climate-envelope temperature of the cabinet itself.

SUMMARY OF THE INVENTION

Embodiments of the invention are used to provide a cabinet sensor probe and method of operation that facilitate automating gathering temperature, relative humidity, and airflow data within a server (e.g., CHATSWORTH) cabinet. The described sensor assembly is incorporated into an overall system providing automated: sensor data gathering, warning issuance, reporting, and even remedial actions.

Applicants' claimed invention is directed to an environmental parameter monitoring system for a closed server cabinet. The monitoring system includes a cabinet sensor probe (CSP) that includes a sensor assembly and a vertical linear actuator. The sensor assembly includes at least three environmental parameter sensors, wherein each one of the environmental parameter sensors is configured to at least render a signal representative of a sensed temperature. The sensor assembly also includes a sensor carriage configured to hold the at least three environmental parameter sensors at particular horizontally distinct positions such that each one of the at least three environmental parameter sensors occupies a position horizontally displaced from each of the other ones of the at least three environmental parameter sensors.

The CSP further includes a vertical linear actuator that is configured to move the sensor assembly along a linear vertical path between a top and bottom of a door of the closed server cabinet.

The system provides a comprehensive temperature and humidity report for each closed cabinet without requiring customer intervention, cabinet airflow disturbance, or protracted staff time.

The system also facilitates providing an automated 'cabinet hygiene' climate diagnostic with the potential of becoming a valuable enhanced service offering to customers.

The system also facilitates providing a monitoring product for server cabinets allowing customers real-time access to information relating to the operating temperature/humidity and airflow environment of their server or network rack-mounted hardware.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIGS. 3a, 3b and 3c illustratively depict a first exemplary cabinet sensor probe assembly (and close-up views of primary components thereof) attachable to an inside surface of a server cabinet;

DETAILED DESCRIPTION

Figure 1:
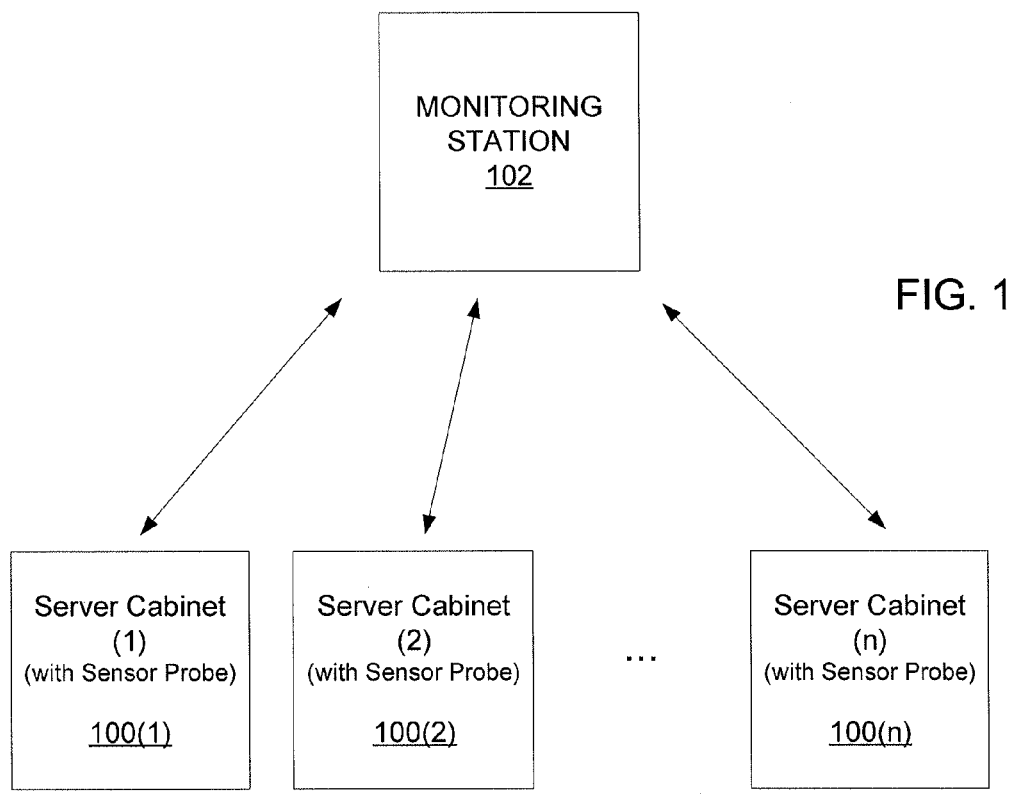
FIG. 1 illustratively depicts an exemplary networked environment wherein multiple cabinet sensor probe (CSP) equipped server cabinets are communicatively coupled to a networked server that maintains a centralized database of historical sensor data for each of the individual cabinets.

Turning initially to FIG. 1, an exemplary networked (e.g. data center) environment is depicted wherein multiple cabinet sensor probe (CSP) equipped server cabinets, such as an array of "n" server cabinets 100(1-n), are communicatively coupled to a monitoring station 102 that receives and processes sensor reports, including sensor readings, alerts and alarms to render a centralized repository (e.g., searchable database) of historical sensor data for each of the individual cabinets 100(1-n). By way of example, each CSP installed within one of the individual cabinets 100(1-n) operates independently from the other CSPs to render reports, alerts and alarms to any interested party via local and/or wide area network communications. By way of example, each individual CSP is configured with an interface capable of responding to HTTP requests issued by the monitoring station 102 polling the individual CSPs for their stored sensor readings, alerts, alarms, and records of remedial measures taken by the CSP to address an alarm condition. The monitoring station 102 processes the received information from the individual, uniquely identified CSPs and thereafter stores the information in a form that is retrievable by an administrator/technician. Additionally, the individual CSPs are configured to push their information using, for example SNMP messaging, to the monitoring station 102 that operates as a designated central (e.g. SNMP) server. The pushed reports and information are received and processed by the monitoring station 102. The pushing of CSP data, by an individual CSP to the monitoring station 102, is triggered by a variety of sensed conditions including: an alarm condition requiring immediate attention, a series of alerts indicating that a problematic condition (a sensed overheating rack) cannot be corrected without outside help, an elapsed periodic timer, etc. The networked arrangement, that may be implemented in the form of LAN and/or WAN connections open up a variety of real-time monitoring, maintenance, and repair functions that are not otherwise available to data center operations. Such further enhancements, among others, include:

(1) Extending web-based front-end user interfaces to obtain and display cabinet power information from power usage monitors installed in each cabinet. This, in turn, provides real-time power usage statistics at a per-server cabinet level of granularity and even at each rack level within each server cabinet.

(2) Extending web-based front-end user interfaces to include cabinet inventory management. Such functionality includes entering equipment name and/or other identification information into the webpage that can uniquely identify each server cabinet and associated current and historical temperature/humidity information.

(3) Extending web-based front-end user interfaces to include card access reports and user management, which identify instances of open/closing a cabinet door and the operator that performed the action, on a per-cabinet basis.

(4) Extending web-based front-end user interfaces to include input functionality for receiving operator requests/commands for remotely controlling the CSP and/or various environment controls on a per-cabinet basis to provide regulatory/supervisory control of server cabinets on a specific cabinet or even individual rack unit within a particular cabinet basis.

(5) Extending web-based front-end user interfaces to provide a comprehensive (holistic) view of multiple cabinet units and aggregate statistics from modules—grouped by cabinet numbers (e.g. can be used for assignment of a customer group, or physical group).

The above-identified network-based functional features enable the cabinet to report updates to a dynamic web-page which polls CSP control units at a specified time interval, retrieves the updated data, and updates the report on the webpage. Additionally, trending and change notifications (including alert notifications on change in percentage or surpassing of a set threshold value) may be available on the web page.

Figure 2:
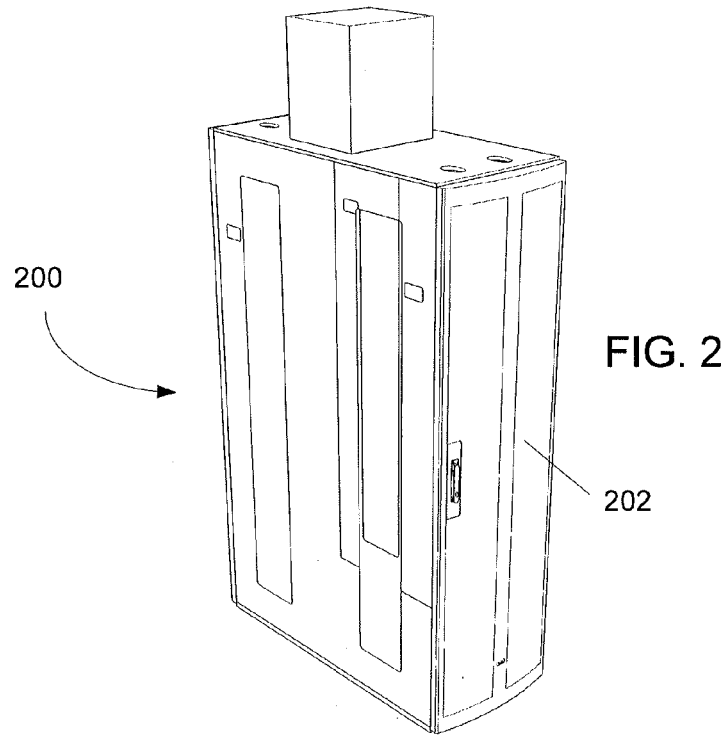
FIG. 2 illustratively depicts an exemplary server cabinet to which the claimed temperature and relative humidity sensor system is directed.

Turning to FIG. 2, in accordance with exemplary embodiments of the invention described herein, a CSP (not shown), which is positioned next to an inside surface of a door 202 of a server cabinet 200, acquires and processes temperature and relative humidity sensor data acquired in the vicinity of the inside surface of the door 202. As will be explained with reference to multiple exemplary embodiments depicted in the drawings and described herein, the CSP comprises a vertical guide running substantially the vertical length of the door 202, and a sensor assembly (including both temperature and humidity sensors) that comprises either a single swept sensor (that is also horizontally swept) or multiple sensors mounted upon a horizontally disposed sensor carrier arm. In the case of a CSP having a single swept sensor, a mechanical drive causes a vertical sweeping of the sensor carrier arm along a length of the vertical guide, and a second mechanical drive sweeps the single sensor horizontally to provide comprehensive/complete two-dimensional coverage, at a configurable level of granularity, of a plane parallel with, and proximate to, the inside face of the server cabinet.

Embodiments of the CSP, and the server cabinet 200 within which the CSP is mounted, are further enhanced by including temperature/humidity sensors and/or air flow sensors that are positioned proximate various vents and exhaust hoods located at various locations (e.g. top and front panel) of the server cabinet 200. These additional sensor components provide a more comprehensive arrangement for sensing and regulating the environment within the server cabinet 200 by enabling calculation of a variety of operating parameters including: temperature and relative humidity differences from the front to the back of the cabinet, percent of heat exhausted (through particular monitored vents), current exhaust hood airflow, and exhaust air temperatures. By monitoring/calculating/recording these operational parameters on a per cabinet basis, the operator of a data room can automate various environment controls to address overheating and/or high humidity conditions at a high degree of granularity on an automated basis. For example, a centralized programmed controller can respond to a detected high localized temperature at an identified one of the server cabinets by increasing an exhaust fan speed or increase the magnitude of a vent opening to address the detected high localized temperature.

Figures 7A, 7B, 7C, 7D:
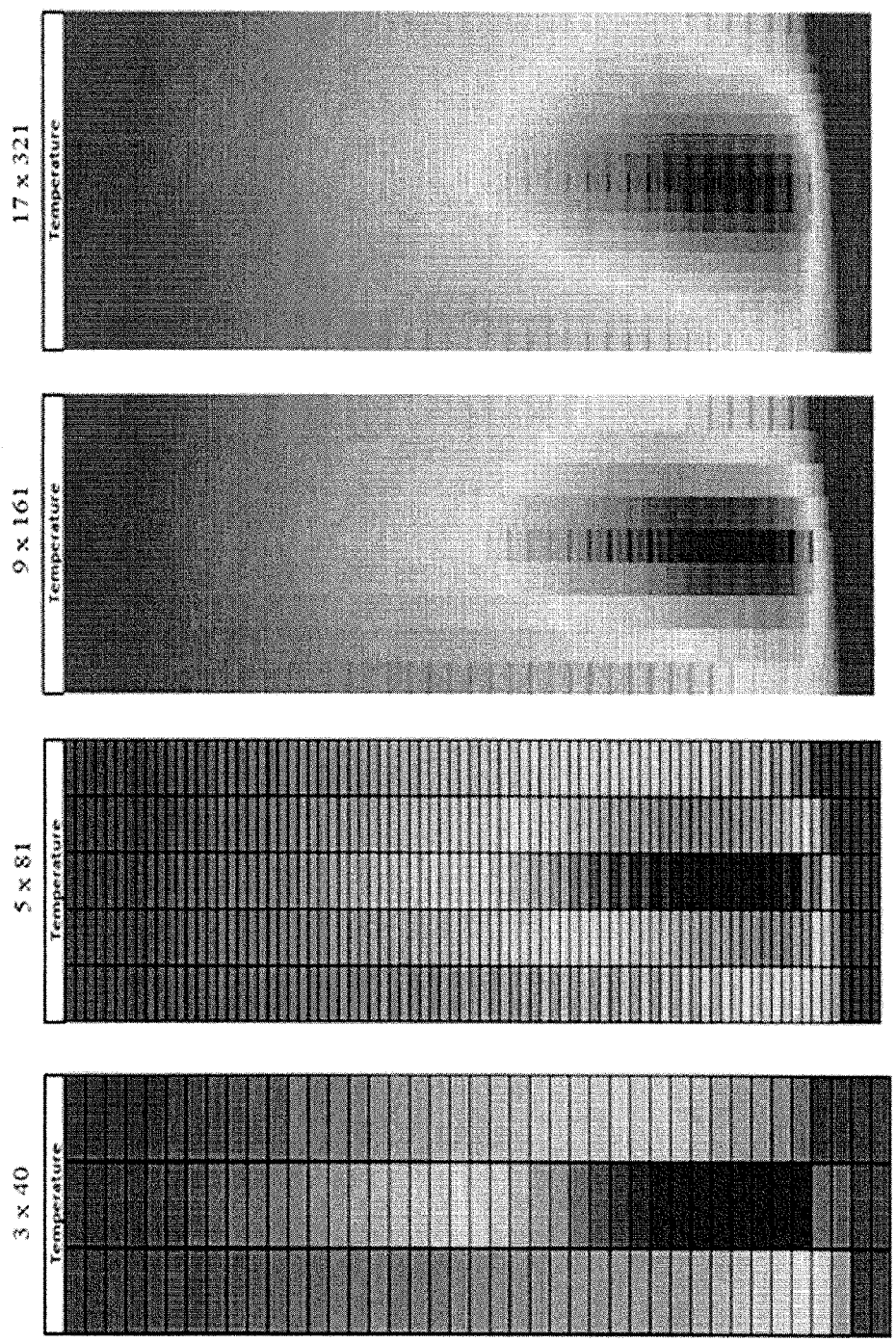
FIGS. 7a, 7b, 7c and 7d provide a set of temperature plots based upon different levels of interpolation based upon gathered sensor readings.

In operation, the temperature values rendered by a full vertical sweep of the sensor carrier arm (also swept horizontally at each vertical position if in a single sensor configuration) of the CSP assembly facilitate creating a two dimensional grid of sensed temperature (and humidity) along a plane parallel to the inside face of the server cabinet door 202. The values of the two-dimensional grid of temperatures may be averaged to render a two-dimensional temperature map for the server cabinet. See e.g. FIG. 7*a*. Such temperature map, that may be color-coded, provides a way to quickly identify an abnormally hot (or cold) server board of a set of boards mounted in the server cabinet 200.

Various exemplary embodiments of the CSP assemblies described herein incorporate/exhibit one or more of the following characteristics:

1. Provides an automated solution for cross-section scanning the back of a server cabinet within which a CSP is installed.

2. Produces a report representing a two-dimensional visual heat map of temperatures (and also humidity), as well as relevant quantitative statistics of highest & lowest rack unit (i.e., rack level) environmental values and cabinet average environmental values.

3. Does not intrude upon equipment in the cabinet or obstruct airflow in any way.

4. Installs on an inside face of a server cabinet door.

With the above design considerations in mind, multiple proposed exemplary embodiments are described herein below.

Turning to FIGS. 3*a*, 3*b* and 3*c*, a first example arrangement includes a rail-based system that is held in-place by hanging on the top edges of a CHATSWORTH server cabinet door. A control unit 300 is mounted to a top of a door (not shown), and a vertical rail 302 extends along the inside surface of the door. A sensor 304 is hung by a line (e.g. thin wire), which extends to the sensor 304, from a reel rotated (to wind/unwind the wire) by a servo motor 306. The sensor 304 is mounted upon a cart 308 and installed facing toward the server electronic equipment. The cart 308 includes wheels 310 and 312 that permit movement of the cart 308 (and sensor 304) along a vertical path defined by guides of the vertical rail 302. This arrangement is depicted in the drawings of FIGS. 3a, 3b and 3c.

To achieve a comprehensive two-dimensional heat-map of the server cabinet 200, using sample data, both x-axis and y-axis samples are captured. Thus, the CSP design depicted in FIGS. 3a, 3b and 3c further includes a second, horizontally moving linear slide allowing the vertical rail (and sensor 304) to be swept along a horizontal axis. The sensor 304 moves horizontally and takes samples of environmental data at multiple horizontal positions at any given vertical position. In an exemplary scanning arrangement, once one rack unit (3.5" level) is scanned, the sensor 304 is moved vertically (by actuating the servo motor 306) to continue capturing another set of samples at various horizontal positions at the current vertical (rack unit) level. This two-dimensional scanning process continues until the sensor 304 reaches the top of the cabinet and completes a set of readings at that top level.

In an exemplary embodiment, IGUS linear slides are used. A ¼" lead screw is attached to each servo, using a coupler, and guides each carriage on the guide rails. A single AM2302 sensor is installed onto the carriage to provide highly accurate readings of temperature (+/−0.5 degrees Celsius) and relative humidity (within 2-5% accuracy) at a current position.

Figure 4A:
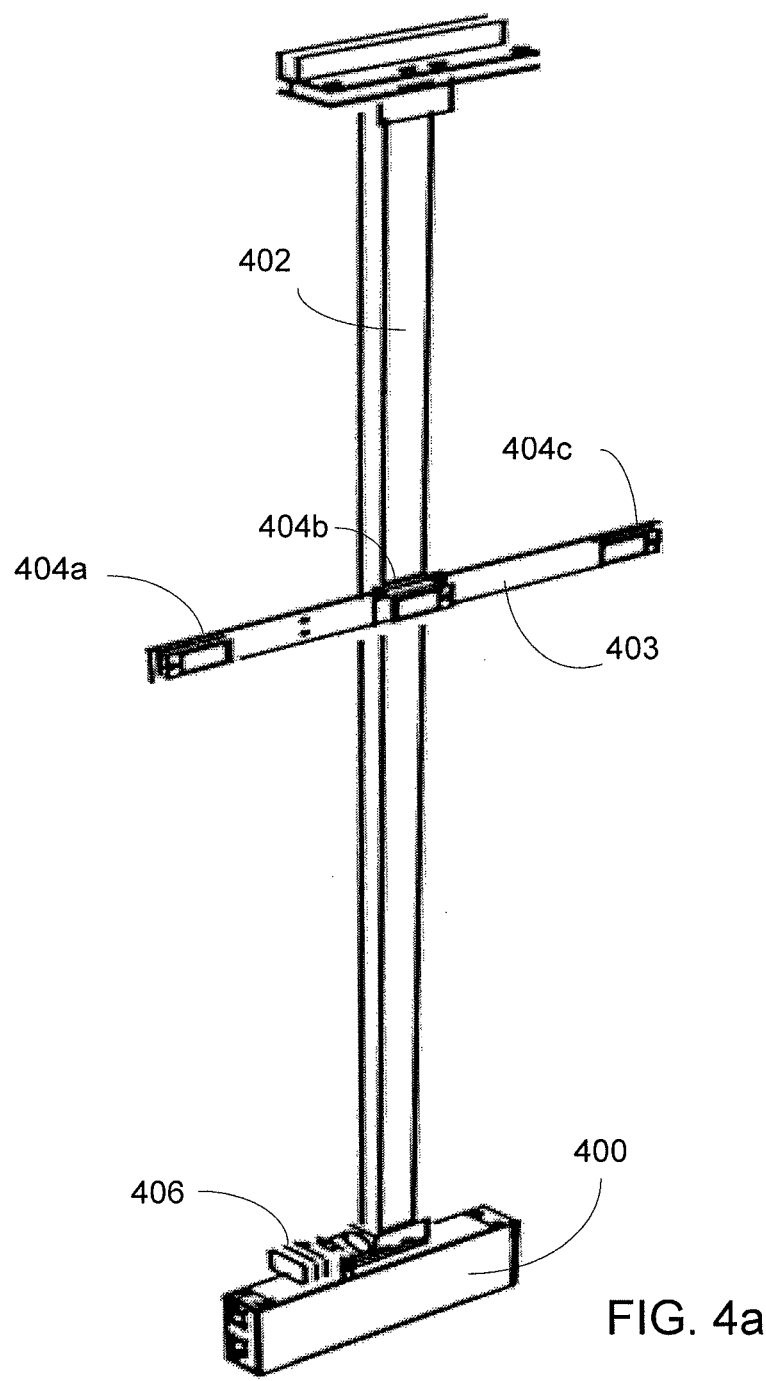
FIGS. 4a, 4b, and 4c illustratively depict a second exemplary cabinet sensor probe assembly (and close-up views of primary components thereof) attachable to an inside surface of a server cabinet.
Figure 4B:
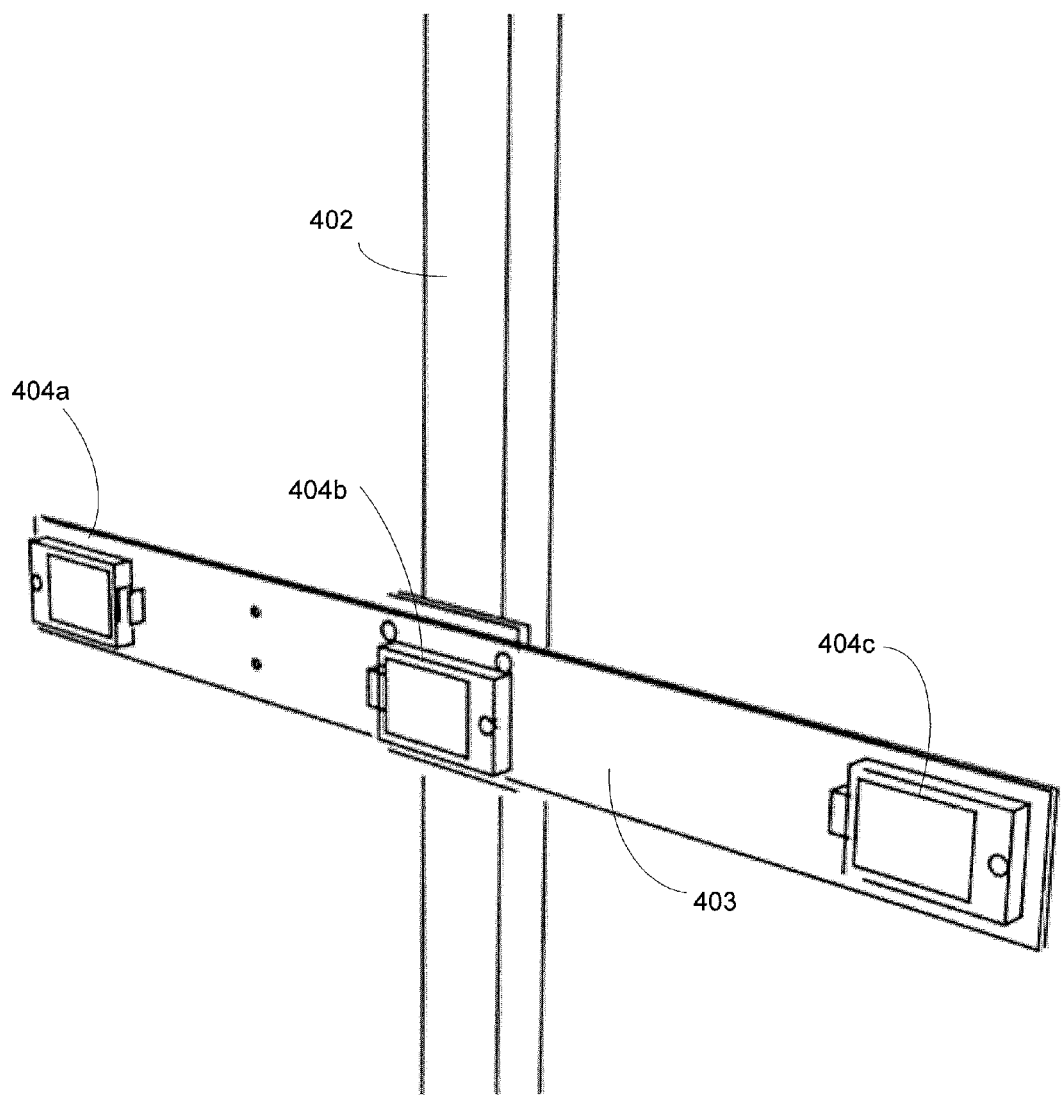
Figure 4C:
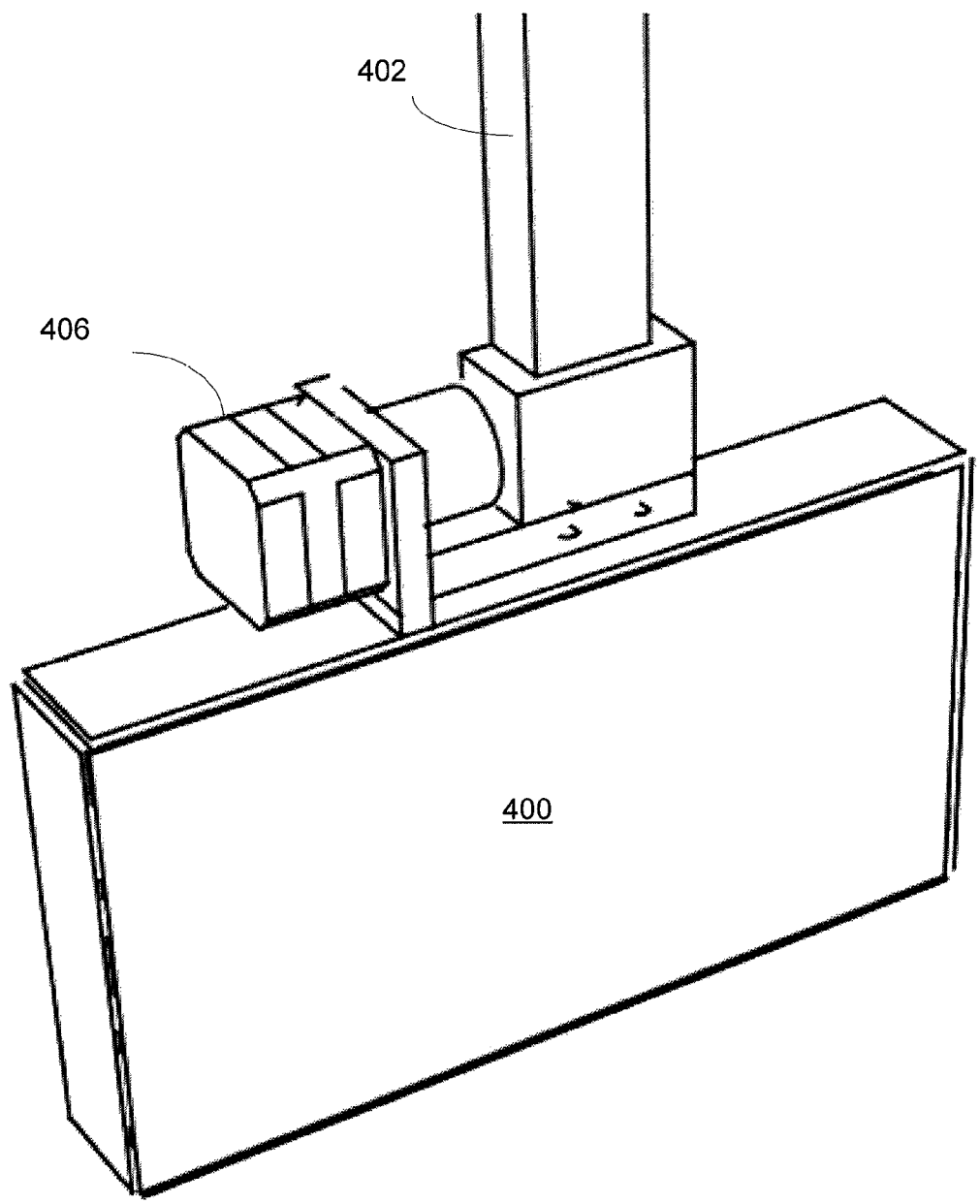
Figure 5A:
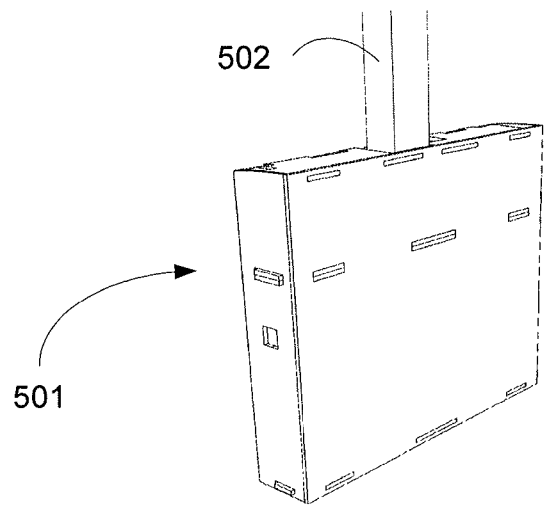
FIGS. 5a, 5b, 5c and 5d illustratively depict a third exemplary cabinet sensor probe assembly (and close-up views of primary components thereof) attachable to an inside surface of a server cabinet.
Figure 5B:
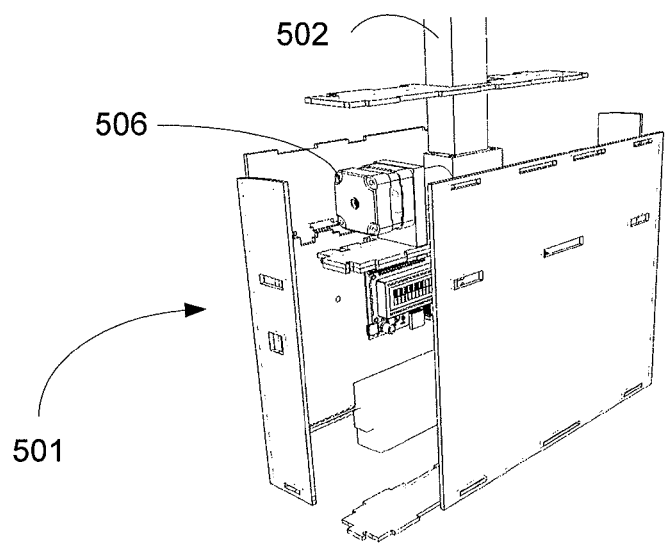
Figure 5C:
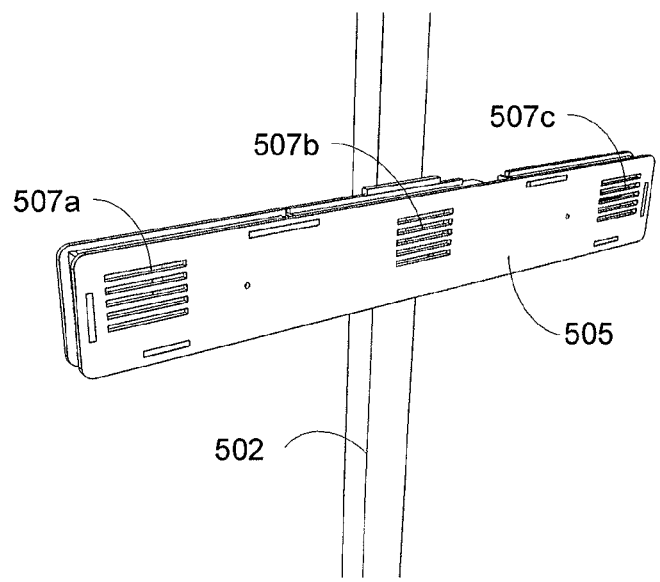
Figure 5D:
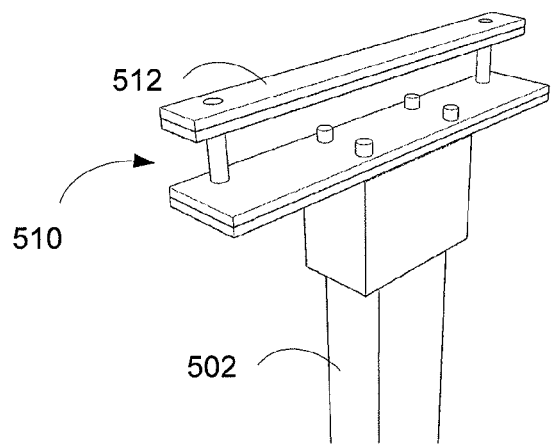

Turning to FIGS. 4a, 4b and 4c a second embodiment of the CSP utilizes multiple sensors 404a, 404b and 404c that are mounted on a linear mounting carriage 403 orthogonal to a single sweeping direction (e.g. mounted on a horizontal bar that is scanned vertically along the inside of a server cabinet door). The second embodiment uses a single actuating motor 406 and sweeps a single planar surface, parallel to an inside surface of a server cabinet door, multiple times faster than the first described embodiment depicted in FIGS. 3a, 3b and 3c.

Additionally, the second embodiment incorporates a belt-driven rail solution for performing vertical sweeps of the server cabinet. A vertical belt-rail system 402 offers higher stability and permits mounting the actuating motor 406 at the end of the guide rail of the belt-rail system 402 for vertically moving the linear mounting carriage 403. Furthermore, at any given vertical position, the linear mounting carriage 403, equipped with three separate AM2302 sensors 404a, 404b and 404c, facilitates taking simultaneous sensor readings from a left, a center, and a right horizontal reading position.

The belt-driven system depicted in FIGS. 4a, 4b and 4c requires considerably higher torque for movement of the carriage along the belt. Therefore, the actuating motor 406 is provided in the form of a stepper motor with sufficient torque to actuate the belt of the vertical belt-rail system 402, thereby providing vertical movement of the linear mounting carriage 403 carrying the individual sensors 404a, 404b and 404c during a sensor sweep. Due to a relatively higher power requirement of the stepper motor (12 volts, 350 mA DC) a separate control unit is used for controlling/actuating the stepper motor.

By way of example, an EASYDRIVER motor control board is used due to its ability to use any available digital ports on a microprocessor. A notable feature of the EASYDRIVER motor control board is a 'sleep' command pin. When a digital signal is passed to the 'sleep' pin, current from the stepper motor power source is disconnected until another digital signal is received. The sleep function facilitates maximizing battery life (if the CSP is not directly connected to external power) by removing unnecessary 12 v power during idle states and between repositioning the linear mounting carriage 403.

A control unit 400 containing the power source and controller electronics is positioned, by way of example, at a bottom of a server cabinet door to create a stable base and allow for short distanced connections between the stepper motor 406 and control unit 400. In the illustrative example, the cabinet door top and bottom each have a 1" 'lip' that allows for the support of the unit depicted in FIG. 4a.

The illustrative example unit is completely self-contained, battery powered (if needed), and attaches to the inside of a CHATSWORTH cabinet door without permanent modifications to the door.

In operation, to start the device, a technician merely needs to connect a battery to the electronics of the control unit 400 (which, in turn powers the motor 406). Once power is applied, the CSP commences gathering samples of temperature and relative humidity of its current position in the server cabinet within which it is installed. Using a belt-driven rail assembly, the stepper motor 406 raises the sensors incrementally to take readings at each rack unit level. By way of example, in operation, when the linear mounting carriage 403 reaches the top rack unit level of the server cabinet, it is lowered by the motor 406, under control of the control unit 400, back down to its idle position, for example the bottom rack unit level, until triggered to perform another vertical sweep.

All sensor data gathered by the sensors 404a, 404b and 404c during operation is saved, by way of example, to a removable SD card (not shown) that a technician may remove once the cabinet scan is completed. Alternatively, the data is communicated via a network connection between the control unit 400 and the central server 102. See e.g. FIG. 1. The sensor data is formatted to be easily accessible by spreadsheet and/or database programs. For example, the stored data is formatted to be viewed/analyzed using, for example, the MICROSOFT EXCEL spreadsheet application.

The spreadsheet data can be mined and processed by visualization applications that provide custom views of the stored/retrieved temperature/humidity data allow for the data to be color-coded which prominently displays a visual representation of any anomalies that may have occurred during the scan. These visualization interfaces enable a technician to quickly identify rack-level server cabinet issues by providing an in-depth look into the environmental status of a cabinet which provides, for example, 120 sample points from each cabinet scan.

Turning to FIGS. 5a, 5b, 5c and 5d, a third exemplary embodiment provides a variation of the second embodiment of FIGS. 4a, 4b and 4c. In the third exemplary embodiment, a housing 501 that is depicted in closed and exploded views in FIGS. 5a and 5b, respectively, completely encloses both a control unit 500 and a stepper motor 506. In other physical respects, including a vertical rail system 502, corresponding to the vertical belt-rail system 402, the lower portion of the CSP mechanical structure is substantially the same as the one depicted in FIGS. 4a, 4b and 4c. Turning briefly to FIG.

5c, in the illustrative third embodiment, a guard plate 505 is positioned in front of a set of sensors at vents 507a, 507b and 507c to prevent physical damage to the set of sensors. Moreover, referring to FIG. 5d, the third embodiment includes an improved latch 510 design that permits relatively easy hanging/removal of the CSP from a top of a server cabinet door by extending vertically and then locking part 512 in place to engage an inner lip of the cabinet door. A similar latch assembly structure (possibly with a fixed extension piece instead of the vertically extendable locking part 512) is provided for the lower portion of the CSP depicted in FIGS. 5a, 5b, 5c and 5d.

The illustrative examples provide a low profile structure extending a maximum of 1.75" into the cabinet at the base. Above the top of the base (10") the profile drops to 1.25" of maximum depth for the sensor carriage. As the majority is contained within the depth of the cabinet door—this allows for a maximum of 1" depth of the unit into the cabinet. The low profile design alleviates concerns of a cable catching on the sensor carriage or hindering cabinet airflow.

Design decisions were made to allow for easy modification of wiring to internal components as well as disassembly. Terminal blocks allowed for wire re-connection without re-soldering. Listed below are several design refinements that would stream-line the creation of additional cabinet sensor probe units.

A machined enclosure created with the dimensions required and planned holes for mounting plates would reduce the amount of excess waste per unit as well as minimize the assembly time required per unit. The build material should either be plastic or aluminum (to minimize conductivity risks). In a particular embodiment, LASER-cut acrylic is used to permit customization of parts while providing reproducibility of results using numeric control machines to perform precise cutting of housing and mounting structures. Additionally, a latching door to access to the control unit compartment would be preferable.

A machined top and bottom notch allow for more precise and snug attachment of the unit to the cabinet door and would allow for easier installation and removal of the sensor probe. The build material should be either plastic or aluminum (to minimize conductivity risks).

A printed circuit board for the control unit connections would reduce the average time to build as much less soldering would be required and reduces the chances for electrical shorts between components due to human error in construction.

A printed circuit board for the connection hub, which provides power to the three sensors from a main 5 volt DC line would reduce the chances for electrical shorts and allow for a more organized cabling solution.

Figure 6:
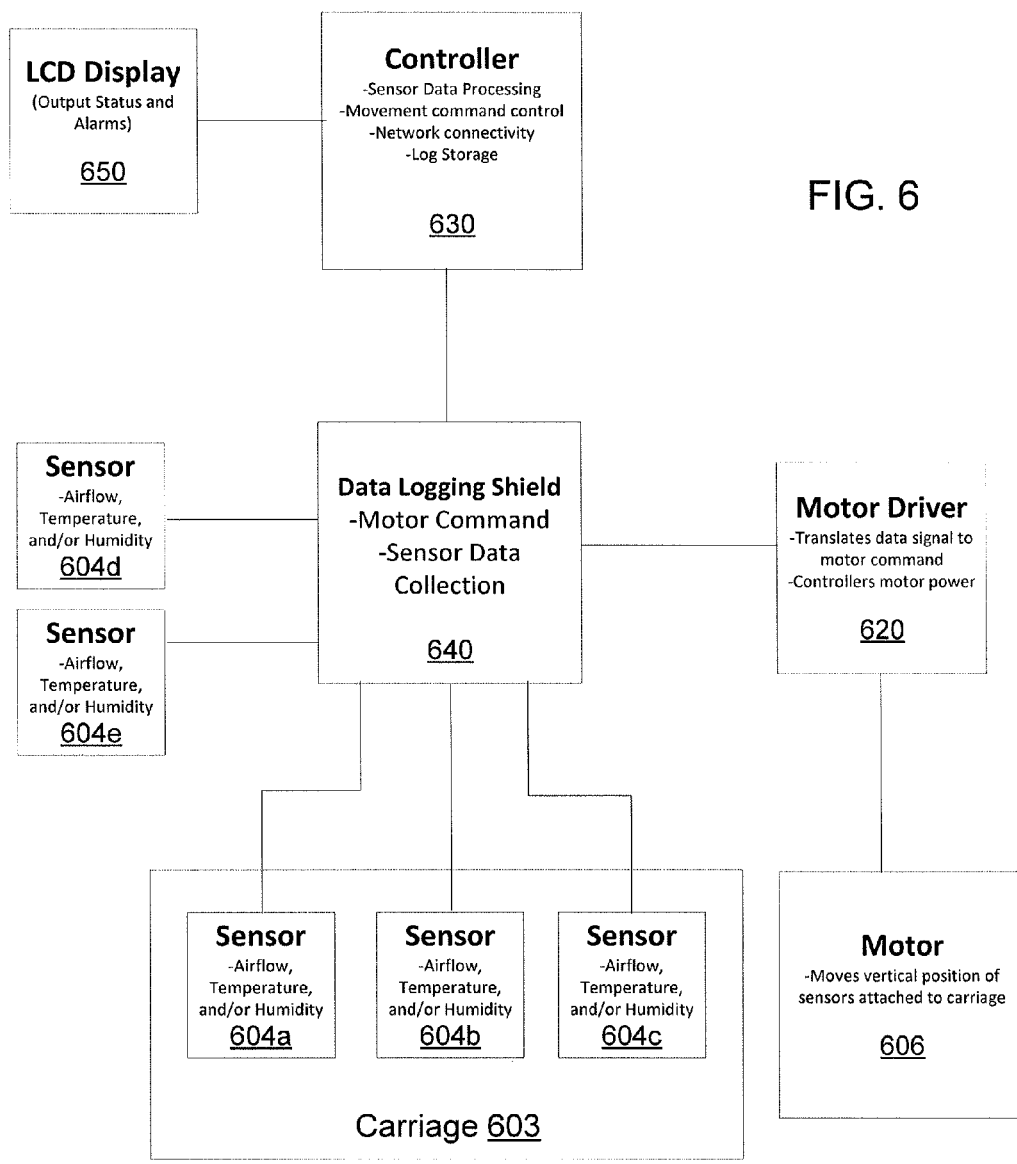
FIG. 6 is an electronic schematic diagram identifying a set of components associated with the cabinet sensor probe assembly.

Turning to FIG. 6, a schematic diagram depicts components of an exemplary embodiment of the controller and sensor electronics (including communications interfaces). In the illustrative example, a motor 606 is a stepper motor having 200 steps/revolution (1.8 degrees per step), a maximum operating voltage of 12 volts and a maximum operating current of 350 mAmps. The exemplary 4-wire bipolar stepper has 1.8° per step for smooth motion and a satisfactory holding torque. The motor 606 has a maximum current of 350 mA so that it can be driven power supplied by a motor driver 620. Alternatively, the motor is directly powered by an AC/DC adapter or DC power source. The motor 606 is connected to a linear belt-driven actuated rail, allowing vertical movement of a sensor carriage 603 upon which a sensors 604a, 604b and 604c are mounted. Moreover, additional sensors 604d and 604e are positioned at vents of the hood of the cabinet 200. In an exemplary embodiment, each of the sensors 604a, 604b and 604c is capable of acquiring/providing signals corresponding to: airflow, temperature and/or humidity.

The set of sensors 604a, 604b, 604c, 604d and 604e are, for example, AM2302 (wired DHT22) temperature-humidity sensors. The AM2302 is a wired version of the DHT22, in a large plastic body. It is a basic, low-cost digital temperature and humidity sensor. It uses a capacitive humidity sensor and a thermistor to measure the surrounding air, and outputs a digital signal on the data pin (no analog input pins needed.) The exemplary sensors have the following characteristics: 3 to 5V power and I/O, 2.5 mA max current use during conversion (while requesting data), good for 0-100% humidity readings with 2-5% accuracy, good for −40 to 80° C. temperature readings ±0.5° C. accuracy, no more than 0.5 Hz sampling rate (once every 2 seconds), body size 27 mm×59 mm×13.5 mm (1.05"×2.32"×0.53"), 3 wires 23 cm long (9"), and 27 mm wide×58.75 mm tall× 13.30 mm deep.

In a battery-powered embodiment, a 9 volt battery (e.g. an 8.4V Tenergy 5000 mAh Flat NiMH Battery Pack with a Traxxas Connector) powers the motor 606.

The motor 606 is driven by a stepper motor driver 620. The stepper motor driver 620 is, by way of example an EasyDriver Stepper Motor Driver. In the illustrative example, the stepper motor driver 620 requires a 7V to 30V supply to power the motor 620. The stepper motor driver 620 has an onboard voltage regulator for the digital interface that can be set to 5V or 3.3V. The stepper motor driver 620 is capable of driving bi-polar motors, and motors wired as bi-polar (i.e. 4, 6, or 8 wire stepper motors). The stepper motor driver 620, by way of example, exhibits the following properties/characteristics: an A3967 microstepping driver, MS1 and MS2 pins broken out to change microstepping resolution to full, half, quarter and eighth steps (defaults to eighth), compatibility with 4, 6, and 8 wire stepper motors of any voltage, adjustable current control from 150 mA/phase to 750 mA/phase, a power supply range from 7V to 30V. The higher the voltage, the higher the torque at high speeds.

A controller 630, in an exemplary embodiment, is an ADAFRUIT Raspberry PI single-board computer. The controller 630 has an operating voltage of 5 volts, digital I/O pins, analog input pins, and a suitably fast clock speed to meet the relatively low processing power requirements of the described system.

A data logging shield 640 is provided (e.g. an Arduino Data Logging Shield) that includes an SD memory card that is compatible with FAT16 or FAT32 formatted cards.

The controller 630 incorporates a Linux-based computer. Moreover, a communications hardware interface of the controller 630 is configured to support both Wi-Fi (e.g. 802.11B/G/N) and ETHERNET (e.g. 802.3) local area network connections. The controller 630 also supports status indicators for sensor data and scan status on an LCD display 650 as well as relevant system network connectivity information. The controller 630 also provides the core functionality of controlling scanning functionality (stop/start/movement) of the CSP, managing acquisition and storage of sensor data, formatting the stored sensor data into application usable (e.g. comma separated values) format, creating heatmap displays (see FIGS. 7a, 7b, 7c and 7d) from sensor data, supporting local area network communications over, for example, SSH and HTTP protocols, creating user-accessible web-frontend user interfaces that provide for remote user command entry functionality to Start/stop/check a cabinet scan, summarize historical data of previous scans, maintain historical copies of previously generated heatmaps from previous scans, specifying scan intervals. In addition, the embedded computer supports and controls simple network management protocol (SNMP) polling and forwarding capabilities so that each cabinet may relay information to a central SNMP monitor which then provides recommendations to building automation management system (BAMS) for airflow and/or temperature adjustments. The controller 630 also provides for alarming status/notifications.

Having described and illustrative control unit and various control, data acquisition, and communications functionality embedded therein. Report functionality is provided, for example, by storing, into a table or other data structure, a scan's CSV (comma separated value) file into a spreadsheet application-readable/displayable data structure which is thereafter read and processed by a displaying function to creates a color-coded heat-map of the cabinet temperatures as well as relative humidity levels. Additionally, the ranges of the samples, as well as the calculated averages are included on a report. Data interpolation is performed (see results shown in FIGS. 7b, 7c and 7d) to increase the granularity of the heat map resolution from the completed 3 column scan data depicted in FIG. 7a. Several possible templates (depicted in FIGS. 7b, 7c and 7d) were created using Microsoft Excel and include additional 5×81, 9×161, and 17×321 resolution images.

Having described multiple exemplary embodiments, it is noted that certain embodiments may include a variety of enhanced functionalities including the ones listed herein below. Embodiments further include a power over Ethernet device and/or battery configuration to reduce/eliminate battery swapping once the cells are depleted. The ETHERNET link would also allow communication to/from device for requests or data transfer.

Yet another enhancement involves upgrading of the processing unit to allow additional sensors and/or display and control button attachments. The display may show items such as current sensor data, results of previous scans, etc. Buttons will allow user configuration of the scan interval, delay interval between samples, and customization based on the cabinet installed upon (such as specifying different Rack Unit sizes).

Yet other enhancements are directed to user request abilities, such as manually requesting the CSP to run a scan or to move the sensors to a specified rack unit in order to audit the current environmental status. Control may be delivered over a local application or network based communications (such as a web page).

Embodiments of the described system include supporting communications between all installed cabinet sensor probes and a centralized database server which stores the particular identified data for further analysis and reporting. For example the data may be used to analyze the current environmental status, calculate the delta between the ideal levels and current levels, and provide recommendations on damper movements within the facility to optimize airflow based on current environmental readings.

On the physical side, enhanced embodiments include extending the rail assembly to span a data room row that may be attached to the ceiling that may provide the environmental status of the row and variations throughout; modifying the rail assembly to be placed inside an air duct or air handling unit which may record current environmental status; and extending the rail assembly to span a data room vertically that may be attached to a wall that may provide the environmental status of the row and variations throughout.

Yet another mechanical/physical variation in alternative embodiments of particular note is directed to an airflow meter/module that is placed at a front and/or back of a cabinet and provides current inlet/exhaust airflow in, for example, cubic feet per minute, which may in turn be used by building automation management systems (BAMS) to calculate and adjust necessary airflow for a data room or on an individual cabinet basis.

Connectivity from power monitoring devices to the unit which allows reporting of current cabinet or individual rack unit data to the monitoring devices.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein known to the inventors for carrying out the invention. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An environmental parameter monitoring system for a closed server cabinet, the monitoring system including a cabinet sensor probe (CSP), the CSP comprising:
    a moveable sensor assembly comprising:
        at least three environmental parameter sensors, wherein each one of the environmental parameter sensors is configured to at least render a signal representative of a sensed temperature, and
        a moveable sensor carriage configured to hold the at least three environmental parameter sensors, such that each one of the at least three environmental parameter sensors occupies a position horizontally displaced from each of the other ones of the at least three environmental parameter sensors; and a vertical linear actuator configured to move the moveable sensor carriage along a linear vertical path extending between a top and a bottom of a door of the closed server cabinet.

2. The system of claim 1 wherein at least one of the environmental parameter sensors is configured to render a signal representative of a sensed humidity.

3. The system of claim 1 wherein at least one of the environmental parameter sensors is configured to render a signal representative of a sensed airflow.

4. The system of claim 1 wherein the CSP further comprises:
   a motor configured to actuate the vertical linear actuator;
   a controller configured to issue:
      actuation commands for the motor to actuate the vertical linear actuator; and
      sensor data acquisition commands for the at least three environmental parameter sensors to render the signal representative of a sensed temperature;
   wherein the controller coordinates actuating the vertical linear actuator and rendering signals representative of a sensed temperature to provide a two-dimensional mapping of sensed temperature within the closed server cabinet.

5. The system of claim 1 wherein the CSP further comprises:
   a controller and data storage configured to acquire and store a set of spatially distinct temperature sensor data values, the set of spatially distinct temperature sensor data points being acquired by the at least three environmental parameter sensors at multiple vertical positions within the closed server cabinet, as a result of actuating the vertical linear actuator, to provide a two-dimensionally spaced set of sensed temperature values within the closed server cabinet; and
   a first network interface configured to transmit the two-dimensionally spaced set of sensed temperature values over a network connection.

6. The system of claim 5 further comprising a monitoring station, the monitoring station including:
   a second network interface configured to receive the two-dimensionally spaced set of sensed temperature values over a network connection; and
   a programmed processor configured for:
      analyzing the two-dimensionally spaced set of sensed temperature values, and
      executing, as response to a result of the analyzing, a remedial action relating to the closed server cabinet, the remedial action addressing a condition sensed at a particular vertical level of the closed server cabinet identified during the analyzing the two-dimensionally spaced set of sensed temperature values.

7. The system of claim 6 wherein the monitoring station is configured to receive, via the second network interface, the two-dimensionally spaced set of sensed temperature values over network connections from a set of distinct CSP instances operating within corresponding distinct closed server cabinet instances.

8. The system of claim 1 further comprising at least a fourth environmental parameter sensor positioned at an exhaust opening of the closed server cabinet.

9. The system of claim 8 wherein the fourth environmental parameter sensor is configured to sense air flow though the exhaust opening.

10. The system of claim 1 wherein the vertical linear actuator comprises a motor, and wherein the motor is mounted in a fixed location with respect to a vertical guide defining a vertical path of the moveable sensor carriage.

11. The system of claim 1, wherein the moveable sensor carriage includes a single position of attachment at a horizontal midpoint of the moveable sensor carriage, where the single position of attachment is a point of engagement between the moveable sensor assembly and the vertical linear actuator.

12. The system of claim 11, wherein the vertical linear actuator comprises a belt drive, and wherein the single position of attachment consists of a connection between the moveable sensor carriage and a belt of the belt drive.

* * * * *